United States Patent
Garbow et al.

(10) Patent No.: US 8,364,554 B2
(45) Date of Patent: Jan. 29, 2013

(54) METHOD, SYSTEM AND COMPUTER PROGRAM PRODUCT FOR PROCESSING COOPERATIVE TRANSACTIONS

(75) Inventors: Zachary Adam Garbow, Rochester, MN (US); Bryan M. Logan, Rochester, MN (US); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 11/873,053

(22) Filed: Oct. 16, 2007

(65) Prior Publication Data

US 2009/0099916 A1    Apr. 16, 2009

(51) Int. Cl.
*G06Q 30/00*    (2006.01)
(52) U.S. Cl. ..................... 705/26.3; 705/26.1
(58) Field of Classification Search .............. 705/26–27
See application file for complete search history.

(56) References Cited

U.S. PATENT DOCUMENTS

| | | | |
|---|---|---|---|
| 7,136,833 B1 * | 11/2006 | Podsiadlo | 705/37 |
| 7,315,832 B2 * | 1/2008 | Bauer et al. | 705/26.3 |
| 7,346,568 B1 * | 3/2008 | Cadoux | 705/36 R |
| 2001/0029478 A1 * | 10/2001 | Laster et al. | 705/37 |
| 2003/0110108 A1 * | 6/2003 | Sabella | 705/35 |
| 2005/0049918 A1 * | 3/2005 | Rovner | 705/14 |
| 2005/0108146 A1 * | 5/2005 | Bond | 705/37 |
| 2007/0150405 A1 * | 6/2007 | Greenberg et al. | 705/37 |
| 2008/0046353 A1 * | 2/2008 | Poltorak et al. | 705/37 |
| 2008/0126235 A1 * | 5/2008 | Sullivan et al. | 705/37 |
| 2008/0154686 A1 * | 6/2008 | Vicino | 705/8 |
| 2008/0312945 A1 * | 12/2008 | White | 705/1 |
| 2010/0017344 A1 * | 1/2010 | Hambrecht et al. | 705/36 R |

OTHER PUBLICATIONS

"A Model for IPO Pricing and Contract Choice Decision" (Cho, S., The Quarterly Review of Economics and Finance, vol. 41, issue 3, pp. 347-364, Autumn 2001).*

* cited by examiner

*Primary Examiner* — Jeffrey A Smith
*Assistant Examiner* — Ethan D Civan
(74) *Attorney, Agent, or Firm* — Patterson & Sheridan LLP

(57) ABSTRACT

Embodiments of the invention generally provide a method, system, and program product for sharing electronic transactions among multiple sharing participants. Embodiments of the invention provide techniques for splitting individual lots into multiple "shares," where multiple individuals have an incentive to promote and drive up the price of the lot. Provided the bids reach an acceptable amount, the final selling price is split among each individual in proportion to the number of shares held by each individual.

25 Claims, 5 Drawing Sheets

METHOD, SYSTEM AND COMPUTER PROGRAM PRODUCT FOR PROCESSING COOPERATIVE TRANSACTIONS

BACKGROUND OF THE INVENTION

1. Field of the Invention

Embodiments of the invention are related to methods for creating, managing, and processing electronic transactions. More specifically embodiments of the invention are related to methods and system for facilitating sharing of auction lots among a plurality of participants.

2. Description of the Related Art

Online auctions represent an enormous market, with billions spent on online auctions annually. Online auctions are particularly suited to connecting buyers and sellers that would not otherwise be able to find one another due to high transaction costs. For example, online auctions provide a convenient market for an individual to sell items longer needed and to find niche products that are difficult to find anywhere else. However, many sellers have trouble realizing the full value of their sale items in online auctions.

In some cases, a seller may not have the social or business networks needed to put the seller in touch with the most appropriate group of interested buyers, particularly for items in which only small groups of buyers may be interested. For example, some collectibles may have a great deal of value to a small group of collectors, but otherwise have much less value to the public at large. While an online auction provides a global marketplace for the auction item, that global marketplace is actually limited to active buyers who happen to visit the auction site during the duration of an auction. This may excludes many potential buyers who would be willing to place bids (and increase the sale price).

In other cases, the sellers do not have the background knowledge necessary to determine the market value of their auction items. This lack of expertise in the value of a given item, and the lack of exposure to potential buyers, often allows buyers to get great deals on otherwise valuable auction items, depriving sellers of a fair market value for items being sold.

SUMMARY OF THE INVENTION

Embodiments of the invention generally provide techniques for sharing an online auction among multiple sharing participants. One embodiment of the invention includes a method of sharing an online auction among a seller and at least one share bidder. The method generally includes receiving a request to list an item for sale in the online auction and generating an online auction listing the item for sale. The item is available for bids for a predetermined period. The method also includes receiving a share bid from a share bidder. The share bid may identify the item for sale, a percentage of the online auction that the share bidder is bidding for, and a share price that the share bidder is willing to pay for the percentage. The method also includes receiving an acceptance of the share bid from the seller and during the predetermined period, receiving a bid for the item for sale. The bid may specify a price that an item bidder is willing to pay for item for sale. At the end of the predetermined period, a highest bid received for the item for sale is determined. The method also includes determining a distribution amount for the share bidder equal to the percentage multiplied by the sale price and sending a message to the seller and to the share bidder indicating the distribution amount.

Another embodiment of the invention includes a computer readable storage medium containing a program which, when executed, performs an operation for sharing an online auction among a seller and at least one share bidder. The operation may generally include receiving a request to list an item for sale in the online auction and generating an online auction listing the item for sale. The item is available for bids for a predetermined period. The operation also includes receiving a share bid from a share bidder. The share bid identifies the item for sale, a percentage of the online auction that the share bidder is bidding for, and a share price that the share bidder is willing to pay for the percentage. The operation also includes receiving an acceptance of the share bid from the seller, and during the predetermined period, receiving the full bid for the item for sale. The bid specifies a price that an item bidder is willing to pay for item for sale. At the end of the predetermined period, a highest bid received for the item for sale is determined. The operation may also include determining a distribution amount for the share bidder equal to the percentage multiplied by the sale price and sending a message to the seller and to the share bidder indicating the distribution amount.

Yet another embodiment of the invention includes a system having a processor and a memory containing a shared auction manager application, which when executed by the processor is configured to perform an operation. The shared auction manager application may be generally configured to receive a request from a seller to list an item for sale in the online auction and generate an online auction listing the item for sale. The item is available for bids for a predetermined period. The shared auction manager application may be further configured to receive a share bid from a share bidder. The share bid identifies the item for sale, a percentage of the online auction that the share bidder is bidding for, and a share price that the share bidder is willing to pay for the percentage. The shared auction manager application may be further configured to receive an acceptance of the share bid from the seller, and during the predetermined period, receive the bid for the item for sale. The bid specifies a price that an item bidder is willing to pay for item for sale. At the end of the predetermined period, a highest bid received for the item for sale may be determined. The shared auction manager application may be further configured to determine a distribution amount for the share bidder equal to the percentage multiplied by the sale price and send a message to the seller and to the share bidder indicating the distribution amount.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
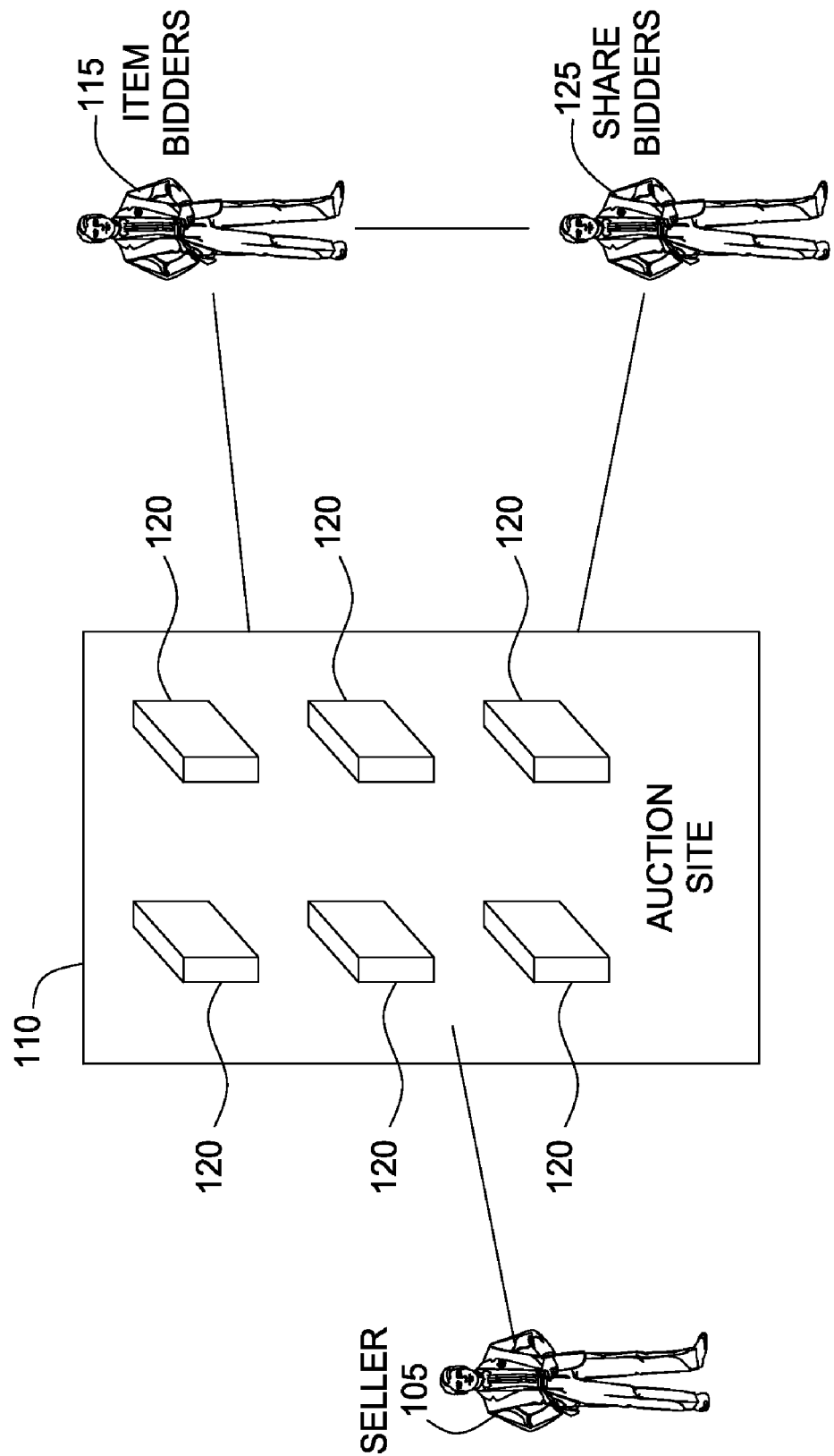
FIG. 1 is a conceptual illustration of a shared online auction system, according to one embodiment of the invention.

Embodiments of the invention generally provide a method and apparatus for sharing an online auction among multiple sharing participants. As described in greater detail below, embodiments of the invention provide techniques for splitting an item for sale in an online auction into multiple "shares," where multiple individuals have an incentive to advertise and drive up the price of the item being sold in the online auction. Provided the bids reach an acceptable amount, the final selling price is split among each individual in proportion to the number of shares held by each individual.

While many online auctions may benefit from being split into shares, expensive and niche items may particularly benefit. For example, splitting an auction of an expensive or niche item into multiple shares reduces risk by lowering the amount at stake in the item for the original seller, without also lowering the overall value or sales price. Splitting an item into multiple shares also diversifies the ownership of the online auction which expands an advertising network attempting to inform potential buyers that the item is available, and brings additional stakeholders into the online auction who have a strong motivation to help increase the selling price.

In one embodiment, an online auction system may be configured to allow an original seller to determine when an auction should be split into shares, manage the shares, and distribute the income among shareholders upon a successful sale of the item.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a conceptual illustration of a shared online auction system 100, according to one embodiment of the invention. As shown, online auction system 100 includes a seller 105, an on-line auction site 110, auction site servers 120, item bidders 115, and share bidders 125. Typically, seller 105 may connect to one of servers 120 of the online auction site 110 using a web browser (or other software) and create a profile of an item to sell through online auction site 110. The profile may include a starting auction price, a description of the item (including text, photographs, etc), information about the seller, an auction period, etc. Once the profile is completed, item bidders 115 may connect to one of servers 120 of the online auction site 110 using a web browser (or other software) and bid on the item listed for sale by seller 105. When the auction concludes, like a real-world auction, the highest bidder wins the item. However, special types of auctions, e.g. reserve auctions, do not necessarily award the item to the highest bidder.

In such a case, a seller may specify a required minimum price that the auction needs to reach before a highest bidder actually receives the item.

Generally, item bidders 115 and seller 105 may use online auction site 110 to buy/sell virtually anything that may be bought or sold. A buyer starts out in an online auction as one of several item bidders 115, competing for a particular item by bidding. Auction site 110 may be a data-center that includes any number server computer systems 120 connected to network and configured to provide on-line auction site to seller 106, item bidders 115 and share bidders 125 (e.g., web servers, application servers, database servers, etc.)

Seller 105 may range in sophistication from someone just selling an old desk cluttering up an attic to a professional antique dealer who recognizes that that same old desk is actually a very valuable piece. Similarly, buyers also range in sophistication too, from people looking for everyday items to serious collectors looking for a great deal from a seller 105 who might not appreciate the value of an auction item.

In one embodiment, system 100 allows seller 105 to allow other participants, referred to as share bidders 125, to buy a share of the sale price of potentially valuable items, giving share bidders 125 an incentive to drive item bidders 115 to bid on an auction at the online site 110. By driving more (or more sophisticated) item bidders 115 to an online auction, share bidders 125 broaden the exposure of the auction item, helping to drive up the sale price, and hopefully increase profits.

A share bidder 125, who may be an expert, may not want to buy the item outright because the share bidder 125 may not want the hassle of buying and reselling the item. Alternatively, the share bidder 125 may not be able to afford the full price, but still sees a way to make some money by purchasing a partial stake in the item.

For example, to continue with the example of an old desk in the attic that, unbeknownst to seller 105, is actually a valuable antique, after creating an online auction on auction site 110 to sell the desk, a share bidder 125 may offer seller 105 $2,000 for a 50% share in the sale price of the auction. If seller 105 accepts the offer, that share bidder 125 becomes a shareholder, and accordingly has an incentive to get the highest possible sale price through the auction. In one embodiment, that share bidder 125 may advertise the auction of the desk at a web site that serves as an online trade journal for antique dealers. Similarly, the shareholder may know a number of antique collectors, and encourage the collectors to participate in the auction created by seller 105.

Hopefully, due to the shareholder's advertisement, a number of dealers and collectors may become item bidders 115 in the auction. Assume the online auction ultimately receives a bid for the desk of $6,000. Seller 105 then splits the sale price with the shareholder according to the shareholder's 50% share. Accordingly, the shareholder receives $3,000, making a $1,000 profit. ($3,000 share minus the $2,000 investment). At the same time, seller 105 receives $5000, which may be much more than seller 105 would have received without the efforts of share bidder 125 in directing the most interested potential buyers to the online auction.

By accepting the bid from the share bidder 125, seller 105 immediately receives value for what turns out to be a valuable antique (i.e., the $2000 price paid for a 50% stake in the auction). Further, seller 105 is teamed with a partner motivated to increase the ultimate auction price. By using advertising and other networking channels to increase the number of item bidders 115 participating in the auction of seller 105, share bidder 125 increases the profit both to himself and to share bidder 125.

Figure 2:
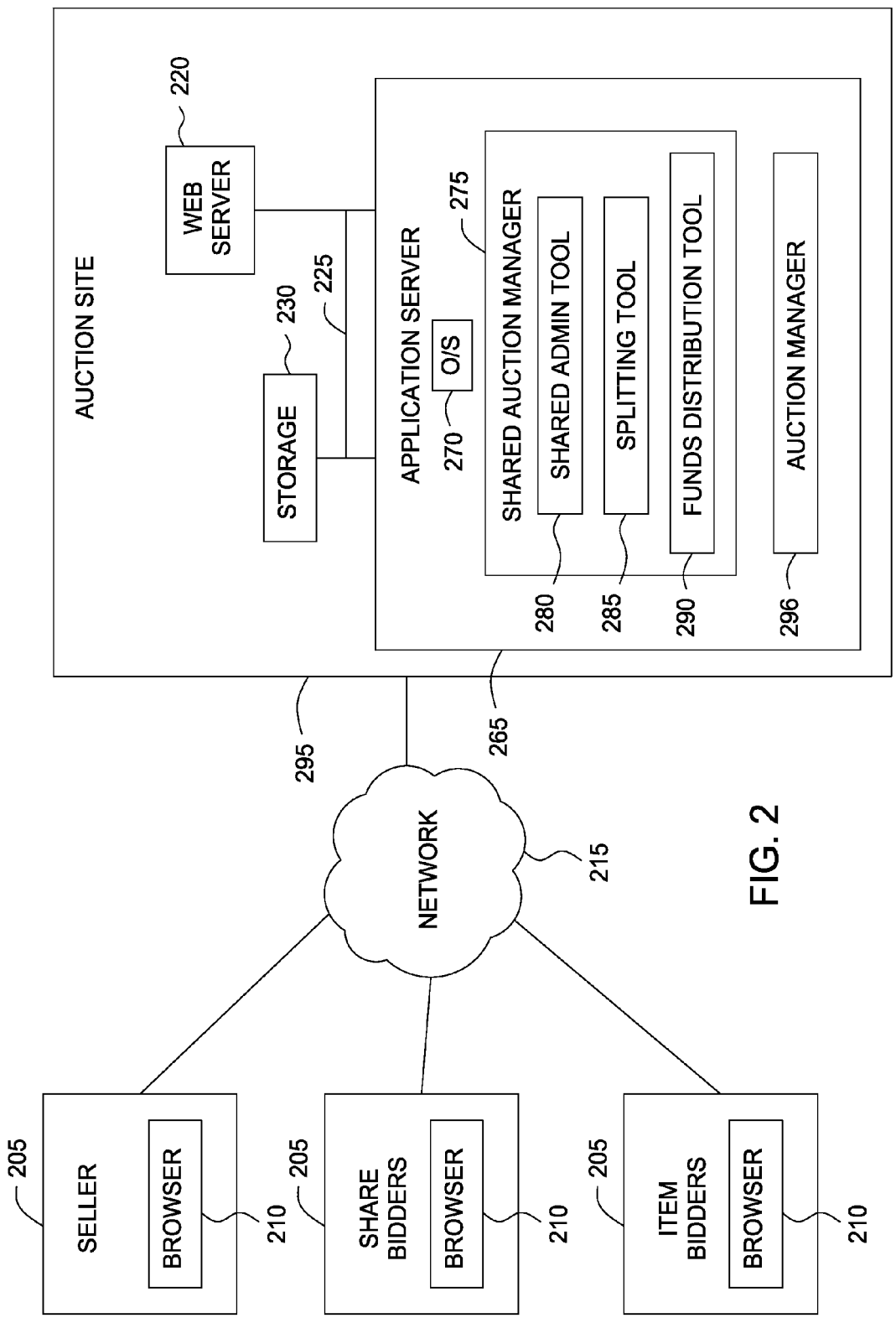
FIG. 2 is a block diagram illustrating components of an online auction system, according to one embodiment of the invention.

FIG. 2 is a block diagram illustrating an online auction system 200, according to one embodiment of the invention. As shown, system 200 includes client computer 205 for a seller 105, a share bidder 115, and item bidders 125. Each client computer 205 may include a browser 210 configured to communicate over network 215 with the online auction site 295.

Also as shown, online auction site 295 includes a web server 220, storage 230, and an application server 265 connected by a network 225. As is known, web server 220 may be a software application configured to provide web-related functionality, such as receiving and responding to http requests and serving web pages over network 215. The storage 230 represents both volatile and non-volatile memory storage. In addition, storage 230 may be considered to include memory physically located elsewhere, for example, any storage capacity used as virtual memory or a mass storage device (e.g., DASD) or on another computer coupled to the online auction site 295 via network 215.

Application server 265 includes an operating system (O/S) 270, a shared auction manager 275, and an online auction manager 296. Online auction manager 296 may be configured to provide general functionality for auction site 265, which may include posting items for auction, opening and closing auctions, and receiving bids on items for sale on auction site 265.

Illustratively, shared auction manager 275 includes a shared auction administrative tool 280, a shared auction splitting tool 285, and a shared auction sale funds distribution tool 290. Collectively, tools 280, 285, and 290 are used to manage a shared auction. In one embodiment, administrative tool 280 provides a software application used to configure and manage splitting tool 285, sales fund distribution tool 290, and bid sharing. The splitting tool 285 provides a software application configured to allow a seller to authorize a share bidder to participate in an online auction, typically, by accepting a bid for a percentage in the sales price of the auction. Further, in one embodiment, splitting tool 285 may be further configured to create a bid shareholder website. The bid-shareholder website may allow a seller and a share bidder to monitor the status of an online auction. Sales fund distribution tool 290 provides a software application configured to manage post-sale transactions, e.g., to distribute sale funds among the seller and share bidders in proportion to their shares in an auction item.

As stated, a seller may list an item for auction using auction manager 296. In one embodiment, administrative tool 280 may be configured to review newly posted auction items to identify potentially valuable items with niche markets. For example, collectibles such as antiques, comic books, and baseball cards etc. Further, when administrative tool 280 recognize an item that could benefit from a shared online auction, auction manager 296 may notify an potential share bidder, based on a profile stored on auction site 295. For example, a comic book dealer may request to be notified whenever a comic book is listed for sale on auction site 295. Of course, the profile may specify filters to limit when such a notification is sent. Additionally, the administrative tool 280 may allow a seller to create a shared online auction any time after listing a item for auction.

For example, continuing with the example of a seller who wishes to clean items from the attic, assume that seller 105 finds several shoeboxes full of old baseball cards. And further, that seller 105 finds a Mickey Mantle known to be worth at least $10,000. In such a case, seller 105 may decide to try to sell this valuable card on online auction site 295. After seller 105 creates an auction listing for the Mickey Mantle card, administrative tool 285 may recognize that baseball cards are a niche market, and potentially valuable. Accordingly, the administrative tool 280 may invite seller 105 to create the online auction for the card in a manner that allows share bidders to offer share bids to participate in the auction (in addition to allowing item bidders to simply bid on the card).

Once seller 105 has activated a shared online auction, share bidders 125 may submit share bids. Provided that seller 105 accepts a given share bid, administrative tool 280 may initiate the appropriate transactions to transfer funds from the share bidder 125 to the seller 105. Any commercial payment service may be used.

The administrative tool 280 may verify that the seller has received the funds. Once the funds are verified, the share bidder 125 becomes a shareholder in the auction. In one embodiment, the funds may be transferred to an escrow account until after the auction ends when the purchase funds are distributed according to the shares reduced by the respective share bid prices.

The splitting tool 285 may then create a shareholder website linked to the particular online auction. In one embodiment, the shareholder website provides the shareholder with a venue to advertise the auction item as the shareholder sees fit. Thus, the share bidder may supply content for a website used to highlight the value of the item for sale to potential buyers. After the auction closes, auction manager 296 may be configured to manage the final sale and receive funds for the auction from the buyer. Sale funds distribution tool 290 calculates the proportional shares of the sales price for the seller and the shareholder.

After creating a shared online auction, seller 105 may receive bids for shares in the auction of the Mickey Mantle card. In one embodiment, seller 105 may specify a maximum percentage of the auction that the seller 105 is willing to sell to a share bidder. For example, assume seller 105 receives a share bid of $6,000 for a 50% stake in the Mickey Mantle card. Seller 105 is likely to accept this offer, as it is greater than 50% of an expected price (50% of $10,000=$5,000). Once seller 105 accepts the offer, administrative tool 280 sends a request for the share bidder 125 to transfer the $6,000 to seller 105.

After verifying that seller 105 has received the $6,000 from the share bidder (now a shareholder), splitting tool 285 may creates a website for the shareholder with links to the online auction of the card. The shareholder may use the website to advertise the online auction of the Mickey Mantle card, and draw item bidders 115 to the online auction.

Assume that the shareholder is successful in attracting item bidders 115 to the baseball card auction, and the Mickey Mantle card sells for $20,000. After verifying that the buyer transfers $20,000 to an account managed by auction site 255, sale funds distribution tool 290 calculates a distribution of the funds between the seller 105 and the share bidder 125. In this example, the funds are distributed as follows: 50% of $20, 000=$10,000 to the seller 105 and $10,000 is to the share bidder 125. Accordingly, seller 105 receives a total of $16,000 ($10,000 from the sale price plus $6,000 from the share bidder), and the shareholder makes a $4,000 profit ($10,000 from the sale price minus the initial $6,000 investment).

Alternatively, the sale funds distribution tool 290 may deposit the sale funds ($20,000) into an escrow account, and request transfers out of the escrow account and into each of the seller's and the shareholder's accounts according to their proportionate share.

However, assume the share bidder is unable to attract bidders to the auction and the highest bid for the card is $8,000. Seller 105 and share bidder 125 each receive $4,000 (50% of $8,000=$4,000). Accordingly, seller receives a total of $10, 000 from the auction ($6,000 investment from the shareholder plus $4,000 from the sale price, and the shareholder loses $2,000 ($6,000 investment minus $4,000 from the sale price).

In one embodiment, a share bidder 1235 may specify a guaranteed minimum price for the share bid. The guaranteed minimum price protects the shareholder from potential losses by reducing the shareholder's investment to a 'profit' share, instead of a share in the auction item itself. For auction sale prices greater than the guaranteed minimum price, there is a profit, and the shareholder takes a proportionate share of the profit, instead of the sale. For sale prices below the guaranteed minimum price, there is no profit, and the shareholder receives nothing. The guaranteed minimum price sets a floor, above which the shareholder splits a profit with the seller. Because the share bidder is only bidding on a share of the profit, she can offer less than a bid for a share of the item itself. Accordingly, the share bidder takes less of a risk because no matter how low the sale price, the shareholder only loses the initial investment.

For example, a share bidder 125 could bid $1,000 for a 50% share of the profit on the Mickey Mantle card with a guaranteed minimum price of $12,000. If the card sells for $20,000, the profit on the card is $8,000 ($20,000 sale price minus the $12,000 guaranteed minimum price). The share bidder 125 receives a 50% share of the profit, $4,000, and seller 105 receives the remaining $16,000. Including the $1,000 that seller 105 receives for selling the 50% share in the profit, seller 105 earns total of $17,000. The shareholder receives the 50% share of the profit, $4,000, and makes a total of $3,000 ($4,000 profit minus the $1,000 investment).

Because the share bidder 125 takes on less risk, there is a less gain. However, the return to seller 105 is not diminished. As described above, for a $6,000 investment for 50% of the baseball card, the shareholder profits $4,000 instead of $3,000, while the seller receives $16,000 for selling a 50% share in the item, but $17,000 for selling a share in the profit, as described above.

However, if the card were to sell below the guaranteed minimum price (e.g. if the card sells for $8,000), there is no profit because the sale price is less than the guaranteed minimum price of $12,000. Accordingly, the seller 105 receives the entire $12,000 sale price and makes an additional $1,000 from the shareholder's investment. Although the shareholder receives no share of the sale, the loss is limited to the $1,000 investment. The $1,000 loss is half of the $2,000 loss that the share bidder 125 incurred in the scenario where the share bidder 125 invests in 50% of the auction.

Figure 3:
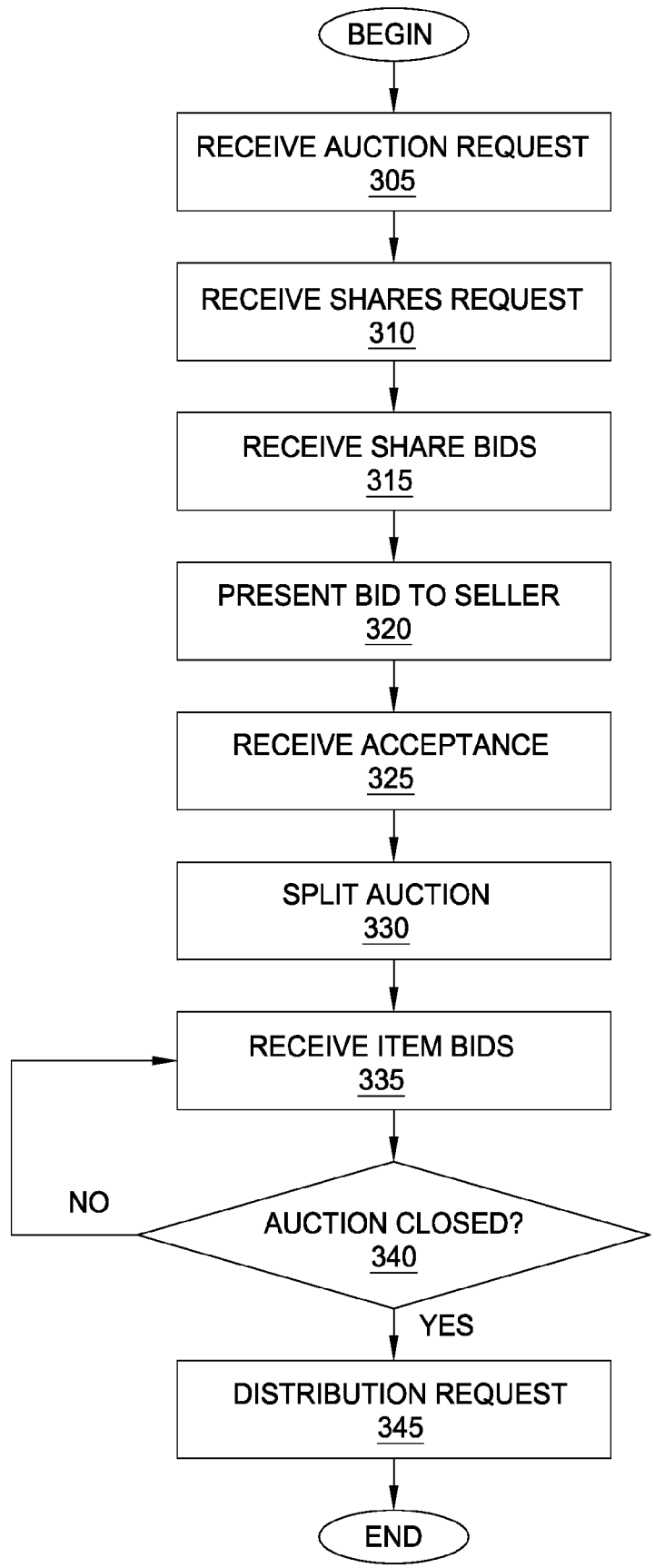
FIG. 3 is a flowchart illustrating a process for sharing an online auction, according to one embodiment of the invention.

FIG. 3 is a flowchart illustrating a method 300 for sharing an online auction, according to one embodiment of the invention. As shown, method 300 begins at step 302, where a seller lists an item for auction at an online auction site. As described, the seller may interact with the auction site using a web browser to send an auction request to the shared auction manager 275. The auction request may include an item description and a minimum selling price that the seller is willing to accept for a sale. Further, the seller may request to list the auction as one in which seller is willing to accept share bids.

For example, using the example described above, the seller may list the Mickey Mantle (with a desired sale price of $10,000) for auction at online auction site 295 using a hypertext mark-up language (HTML) form provided by the auction manager 296. The form may include a checkbox used to select a shared online auction type and to input a minimum sale price for the card (i.e., $10,000). At step 310, after creating an auction from the information received at step 305, the administrative tool 280 receives a share bid for the baseball card. In one embodiment, a share bidder may review a list of online auctions and submit share bids using an HTML form generated by the administrative tool 280 and served to a web-browser.

At step 315, administrative tool 280 receives a bid from a share bidder. In one embodiment, the share bid may include a share percentage, an offered price for the share percentage, optionally, a guaranteed minimum price as described above, and a time limit after which the share bid is no longer valid.

In one embodiment, a seller may specify parameters used to filter out share bids the seller knows in advance that the seller would not accept, including for example, a minimum selling price, minimum and/or maximum share percentages, and/or a rating associated with a share bidder. Of course, the seller may choose to review any share bids received, without any filters. When share bids are received, administrative tool 280 may reject bids that do not meet a minimum selling price on. For example, a seller may require a minimum selling price of $10,000 for an item. Accordingly, the price per share is $100 ($10,000 divided by 100%), and a minimum selling price for a 50% share of the item is $5,000. Offers for a 50% share less than $5,000 or any share percentage for bids less than $100 per share are rejected.

Additionally, minimum and maximum share percentages may establish a range for share bid percentages. In other words, if a seller specifies that the seller is willing to accept share bids in a range of 25% to 50%, all share bids for less than 25% shares are rejected. Similarly, all share bids exceeding 50% of shares are rejected.

In one embodiment, administrative tool 280 may record and store a share bidder rating for all share bidders. For example, share bidders that participate in completed, high dollar value auctions may be more desirable than those participating in lower value auctions, or share bidders who participate in auctions that do not meet the seller's minimum price. Further, share bidders whose websites direct more new item bidders to an auction are more desirable, than those whose websites direct fewer, or none. A seller may require a specific rating level below which the bid for a share bidder is rejected. Other factors that may be considered in a rating include, but are not limited to: average selling price of a share bidder's auctions, average guaranteed minimum price, how often the guaranteed minimum price is met, and how many winning bidders the share bidder has attracted to the share bidder's auctions.

At step 320, the shared auction manager 275 presents share bids to the seller. The presentation could be via an HTML or similar form with links enabling the seller to accept or reject a share bid.

In one embodiment, splitting tool 285 may aggregate multiple share bids to meet a seller's parameters, and present the aggregate bid to the seller as one share bid. At step 325, the administrative tool 280 receives a message from the seller, indicating that the seller has accepted a share bid. In response, at step 330, the splitting tool 285 splits the seller's auction.

At step 335, the administrative tool receives bids on the auction item until the auction closes at step 340. The bids are submitted by item bidders, and may be submitted through the online auction site.

In one embodiment, bids may be submitted to auction site 295. A bid may include a bid price. Additionally, a bid received through a share bidder's website may contribute to a rating for that share bidder. For example, the known HTML referrer attribute may be used to identify that a bid was initiated from the share bidder's website. In some embodiments, share bidders who drive more bids (or more valuable bids) are rated higher than share bidders with fewer (or less valuable bids). Of course one of ordinary skill in the art will recognize that a variety of factors may be used to determine a rating for a share bidder.

At step 340, the auction closes. In one embodiment, the auction manager 296 (or the administrative tool 280) may notify the seller, the share bidder, and the wining bidder that the auction is ended. Typically, the online auction site administers the transfer of funds from the buyer to the seller. Once funds are received from the buyer, at step 345, the administrative tool 280 may invoke the sales funds distribution tool. As described above, the sales funds distribution tool may be configured to determine how to describe the sales funds among the seller and the share bidder.

Figure 4:
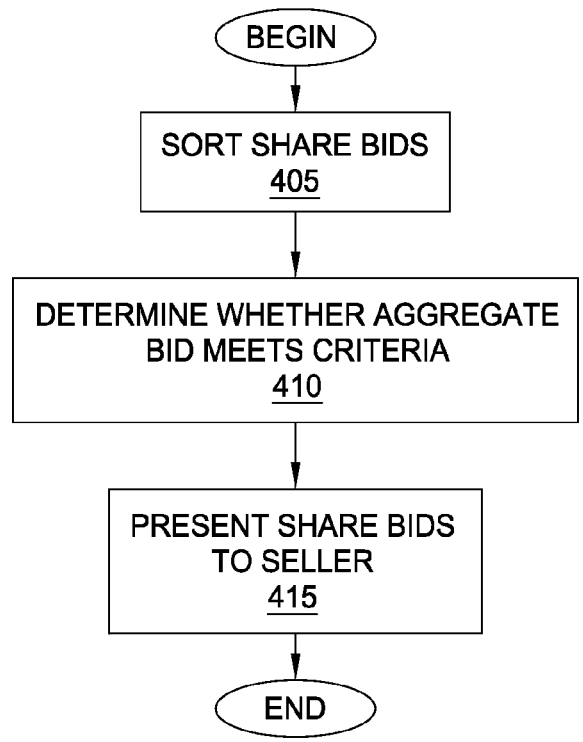
FIG. 4 is a flowchart illustrating a process for aggregating bids received for an online auction, according to one embodiment of the invention.

FIG. 4 is a flowchart illustrating a method 400 for aggregating share bids, according to one embodiment of the invention. As shown, method 400 begins at step 405, where administrative tool 280 sorts a set of share bids based on seller preferences. For example, the share bids may be sorted by the price per share value bid. For example, a share bid for a 25% share for $2,500 has a $100 per share value. A share bid for a 50% share for $4,000 has an $80 per share value. Accordingly, the share bid for 25% would precede the share bid for 50%.

Alternatively, the seller may prefer to have share bids sorted according to a share bidder rating or bid value. A share bidder rating may be available to rate share bidders according to several factors regarding past shared auction participation, including but not limited to: average sale price, average bid price, number of bidders directed to an auction. Bid value, as opposed to price per share value, refers to the total value of the actual bid. Using the prior example, the bid value of a share bid for 25% at $2,500 is $2,500. Similarly, the bid value of a share bid for 50% at $4,000 is $4,000. Accordingly, sorting by bid value, the share bid for $4,000 would precede the share bid for $2,500.

At step 410, the administrative tool 280 determines whether an aggregation of the share bids meets the seller's share bidding criteria. For example, assume a seller specifies share bidding criteria for the Mickey Mantle card as follows: a minimum 25% a maximum 50% share, and a minimum selling price of $10,000 (which equals $100 price per share).

The administrative tool 280 may receive three different share bids, a bid for a 25% share for $4,000 from share bidder A, another bid for a 50% share for $5,000 from share bidder B, and another bid for a 25% share for $3,000 from share bidder C. In such a case, the order of the sorted bids is as follows:

TABLE I

Sorted Bids

| Share Bidder | Percent Share | Price | Price per Share |
|---|---|---|---|
| A | 25% | $4,000 | $160 |
| C | 25% | $3,000 | $120 |
| B | 50% | $2,500 | $100 |

The first two bids constitute an aggregate bid of a 50% share (Jim's maximum) for $7,000. Each bid meets Jim's minimum price requirement. Accordingly, the combined bids also meet the requirement.

At step 415, the administrative tool 280 may present the share bids to the seller as shown above. In one embodiment, the administrative tool 280 may place a line after the last bid constituting the aggregate bid. In this case, the line would be drawn after the row with share bidder C and before the row with share bidder B. The line indicates to the seller which bids are included in the share bid offer. The presentation may be invoked by the seller in response to a request to view share bids. Other embodiments of the invention may present the share bids as part of a notification process once the administrative tool 280 determines that the seller has an aggregate bid that meets the seller's criteria.

Figure 5:
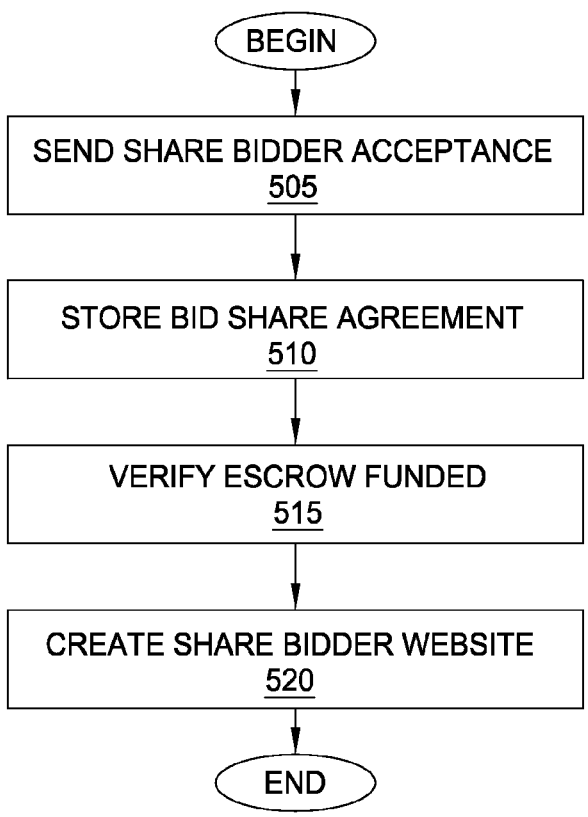
FIG. 5 is a flowchart illustrating a process for splitting an online auction into multiple shares, according to one embodiment of the invention.

FIG. 5 is a flowchart illustrating a method 500 for splitting auctions, according to one embodiment of the invention. As shown, the method 500 begins at step 505, where, after the seller has accepted a share bid, the administrative tool 280 sends a notification to the share bidder that the seller has accepted the share bid. At step 510, splitting tool 285 stores the share agreement between the seller and the share bidder in the storage 230. The share agreement may include the agreed-upon terms such as the seller's minimum sale price, percentage of the share purchased by the share bidder, price for the share percentage, and the guaranteed minimum price.

At step 515, splitting tool 285 may verify that the share bidder has transferred the agreed-upon amount for the share bidder to purchase a share of the online auction. At step 520, the splitting tool 285 may generate a website for the share bidder. The splitting tool 285 may allow the share bidder to modify a template for accepting bids or otherwise create and/or contribute custom content. Those skilled in the art will recognize that the splitting tool may provide share bidder with a variety of choices for building and/or customize a website generated for the share bidder to use in promoting the item for sale in the online auction.

Further, if the share bid is an aggregate from several share bidders, the seller may specify a bid reward to encourage competition among the share bidders. The bid reward may be an additional percentage of the seller's remaining share, or potentially a flat fee, paid to the share bidder that brings in a winning item bid.

Figure 6:
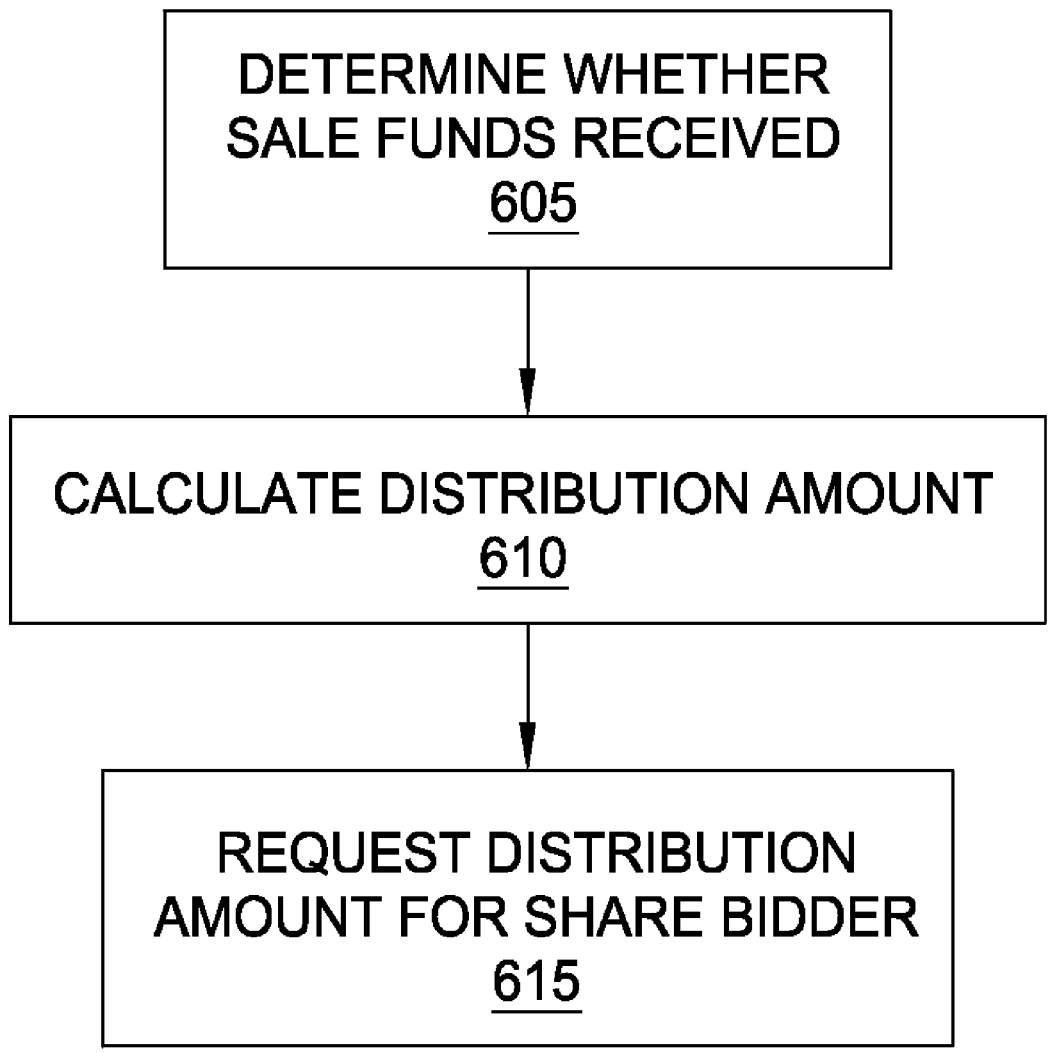
FIG. 6 is a flowchart illustrating a process for distributing a sales fund of a shared online auction, according to one embodiment of the invention.

FIG. 6 is a flowchart illustrating a method 600 for distributing funds after the close of an online auction, according to one embodiment of the invention. As shown, the method 600 begins at step 605, where the sales fund distribution tool 290 verifies that the buyer has transferred funds to the seller in an amount equal to the sales price of the item. Alternatively, the buyer may deposit funds into an escrow account. For example, the online auction site may offer an escrow service for shared auctions for an additional fee. In such a case, distribution tool 290 verifies that the sales funds are transferred into the appropriate escrow account. Advantageously, the shareholders are not paid until the funds arrive in the escrow account. This advantage removes an incentive for shareholders to defraud a seller by posing as fraudulent buyers.

At step 610, the distribution tool 290 then calculates the shares of the shareholder and the seller, according to the percentage shares each holds, as recorded in the shares agreement. At step 615, the distribution tool sends requests for the respective shares of the sales price to be transferred from the seller's account to the shareholder's account. In the embodiment that implements an escrow account, the request would be for a transfer of funds from the escrow account to both the seller's and the shareholder's accounts.

While the foregoing is directed to embodiments of the present invention, other and further embodiments of the invention may be devised without departing from the basic scope thereof, and the scope thereof is determined by the claims that follow.

What is claimed is:

1. A method of sharing proceeds of an online auction among a seller and at least one share bidder, comprising:
  receiving a request to list an item for sale in the online auction;
  generating, by one or more computer processors, the online auction listing the item for sale, wherein the item is available for bids for a predetermined period;
  receiving share bids from a plurality of share bidders, wherein each share bid identifies the item for sale, a percentage of the proceeds of the online auction that each share bidder is bidding for, and a share price that the share bidder is willing to pay for the percentage;
  receiving an acceptance of one or more of the share bids from the seller;
  during the predetermined period, receiving one or more bids for the item for sale, wherein each bid specifies a price that an item bidder is willing to pay for item for sale;
  at the end of the predetermined period, determining a highest bid received from the item bidders for the item for sale; and
  upon determining the highest bid was submitted via a web-site associated with one of the share bidders accepted by the seller:
    determining a distribution amount for the share bidder equal to the percentage multiplied by the sale price, and
    sending a message to the seller and to the share bidder indicating the distribution amount.

2. The method of claim 1, further comprising:
  determining a plurality of distribution amounts for the plurality of share bidders equal to the sale price multiplied by the respective percentage of ownership for the respective share bidder; and
  sending a message to the seller and to the each of the share bidders indicating the distribution amount.

3. The method of claim 1, further comprising, generating a web-site for each of the plurality of share bidders, wherein each web-site includes at least a link to the item for sale on the online auction 4. The method of claim 3, wherein the link for a given one of the plurality of share bidders indicates an identity of the web-site of that share bidder when the link is used to submit a bid for the item for sale.

5. The method of claim 2, further comprising, receiving a bid reward amount from the seller, wherein the bid reward is distributed to a share bidder that drove the buyer to the online auction.

6. The method of claim 1, further comprising:
  receiving a bid parameter from the seller specifying at least one of:
    a maximum percentage of ownership in the online auction the seller is willing to sell to the share bidder;
    a minimum percentage of ownership in the online auction the seller is willing to sell to the share bidder;
    a minimum share bidder rating the seller requires for a share bidder.

7. The method of claim 1, wherein the share bid further identifies identifies a minimum sales price for the item for sale.

8. The method of claim 1, further comprising:
  generating the web-site for the share bidder that includes at least a link to the item for sale on the online auction.

9. The method of claim 8, wherein the share bidder contributes content for the web-site generated for the share bidder.

10. A non-transitory computer readable storage medium containing a program which, when executed, performs an operation for sharing an online auction among a seller and at least one share bidder, comprising:
  receiving a request to list an item for sale in the online auction;

generating an online auction listing the item for sale, wherein the item is available for bids for a predetermined period;

receiving share bids from a plurality of share bidders, wherein each share bid identifies the item for sale, a percentage of the proceeds of the online auction that each share bidder is bidding for, and a share price that the share bidder is willing to pay for the percentage;

receiving an acceptance of one or more of the share bids from the seller;

during the predetermined period, receiving one or more bids for the item for sale, wherein each bid specifies a price that an item bidder is willing to pay for item for sale;

at the end of the predetermined period, determining a highest bid received from the item bidders for the item for sale; and upon determining the highest bid was submitted via a web-site associated with one of the share bidders accepted by the seller:

determining a distribution amount for the share bidder equal to the percentage multiplied by the sale price, and sending a message to the seller and to the share bidder indicating the distribution amount.

11. The computer readable storage medium of claim 10, wherein the operation further comprises:

determining a plurality of distribution amounts for the plurality of share bidders equal to the sale price multiplied by the respective percentage of ownership for the respective share bidder; and sending a message to the seller and to the each of the share bidders indicating the distribution amount.

12. The computer readable storage medium of claim 10, further comprising, generating a web-site for each of the plurality of share bidders, wherein each web-site includes at least a link to the item for sale on the online auction.

13. The method of claim 12, wherein the link for a given one of the plurality of share bidders indicates an identity of the web-site of that share bidder when the link is used to submit a bid for the item for sale.

14. The computer readable storage medium of claim 12, wherein the operation further comprises, receiving a bid reward amount from the seller, wherein the bid reward is distributed to a share bidder that drove the buyer to the online auction.

15. The computer readable storage medium of claim 10, wherein the operation further comprises:

receiving a bid parameter from the seller specifying at least one of:

a maximum percentage of ownership in the online auction the seller is willing to sell to the share bidder;

a minimum percentage of ownership in the online auction the seller is willing to sell to the share bidder;

a minimum share bidder rating the seller requires for a share bidder.

16. The computer readable storage medium of claim 10, wherein the share bid further identifies a minimum sales price for the item for sale.

17. The computer readable storage medium of claim 10, wherein the operation further comprises, generating the web-site for the share bidder that includes at least a link to the item for sale on the online auction.

18. The computer readable storage medium of claim 17, wherein the share bidder contributes content for the web-site generated for the share bidder.

19. A system, comprising:

one or more computer processors; and a memory containing a shared auction manager application, which when executed by the one or more computer processors is configured to:

receive a request from a seller to list an item for sale in the online auction;

generate an online auction listing the item for sale, wherein the item is available for bids for a predetermined period;

receive share bids from a plurality of share bidders, wherein each share bid identifies the item for sale, a percentage of the proceeds of the online auction that each share bidder is bidding for, and a share price that the share bidder is willing to pay for the percentage;

receive an acceptance of one or more of the share bids from the seller;

during the predetermined period, receive one or more bids for the item for sale, wherein each bid specifies a price that an item bidder is willing to pay for item for sale;

at the end of the predetermined period, determine a highest bid received from the item bidders for the item for sale; and upon determining the highest bid was submitted via a web-site associated with one of the share bidders accepted by the seller:

determine a distribution amount for the share bidder equal to the percentage multiplied by the sale price, and send a message to the seller and to the share bidder indicating the distribution amount.

20. The system of claim 19, wherein the shared auction manager application is further configured to:

determine a plurality of distribution amounts for the plurality of share bidders equal to the sale price multiplied by the respective percentage of ownership for the respective share bidder; and send a message to the seller and to the each of the share bidders indicating the distribution amount.

21. The system of claim 19, wherein the shared auction manager application is further configured to generate a web-site for each of the plurality of share bidders, wherein each web-site includes at least a link to the item for sale on the online auction.

22. The system of claim 21, wherein the link for a given one of the plurality of share bidders indicates an identity of the web-site of that share bidder when the link is used to submit a bid for the item for sale.

23. The system of claim 20, wherein the shared auction manager application is further configured to receive a bid reward amount from the seller, wherein the bid reward is distributed to a share bidder that drove the buyer to the online auction.

24. The system of claim 19, wherein the shared auction manager application is further configured to:

receive a bid parameter from the seller specifying at least one of:

a maximum percentage of ownership in the online auction the seller is willing to sell to the share bidder;

a minimum percentage of ownership in the online auction the seller is willing to sell to the share bidder;

a minimum share bidder rating the seller requires for a share bidder.

25. The system of claim 19, wherein the share bid further identifies a minimum sales price for the item for sale.

* * * * *